United States Patent [19]

Izumi

[11] Patent Number: 5,597,268
[45] Date of Patent: Jan. 28, 1997

[54] MILLING CUTTER FOR T SHAPED GROOVE

[75] Inventor: Mitsuo Izumi, Shijonawate, Japan

[73] Assignee: Izumi Industry Kabushiki Kaisha, Osaka-fu, Japan

[21] Appl. No.: 567,700

[22] Filed: Dec. 5, 1995

[30] Foreign Application Priority Data

Dec. 6, 1994 [JP] Japan .................................. 6-302048

[51] Int. Cl.$^6$ ...................................................... B23C 3/28
[52] U.S. Cl. ................................ 407/51; 407/53; 407/58; 408/224
[58] Field of Search ......................... 407/51, 53, 48, 407/56, 61, 62, 119; 408/222, 223, 224

[56] References Cited

U.S. PATENT DOCUMENTS

| | | | |
|---|---|---|---|
| 2,204,855 | 6/1940 | Healy | 408/224 |
| 2,630,725 | 3/1953 | Black | 408/224 |
| 3,213,716 | 10/1965 | Getts | 408/713 X |
| 4,210,406 | 7/1980 | Berry, Jr. | 408/223 |
| 4,954,021 | 9/1990 | Tsujimura et al. | 407/53 X |
| 4,966,500 | 10/1990 | Tsujimura et al. | 407/53 X |
| 4,975,002 | 12/1990 | Kress et al. | 408/224 |
| 5,141,367 | 8/1992 | Beeghly et al. | 407/119 |
| 5,235,879 | 8/1993 | Drougge | 407/119 X |
| 5,269,618 | 12/1993 | Meyer | 408/224 X |
| 5,302,059 | 4/1994 | Fabiano | 408/223 |

*Primary Examiner*—M. Rachuba
*Assistant Examiner*—Henry W. H. Tsai
*Attorney, Agent, or Firm*—Evenson, McKeown, Edwards & Lenahan, P.L.L.C.

[57] ABSTRACT

It is an object of the invention to provide an economical milling cutter for T shaped groove.

This invention is a milling cutter for T shaped groove comprising at least three cutting edge mounting seats distributed peripherally on a body one end flange of the milling cutter, on the first cutting edge mounting seat a first cutting edge for cutting remotest part from the cutting machine being mounted, on the second cutting edge mounting seat a second cutting edge for cutting nearest part from the cutting machine being mounted, on the third cutting edge mounting seat located between the first and second seats a third round or polygonal cutting edge being mounted, and the third cutting edge projecting radially outwardly from the rotation center line of the body between and from two portions cut by the first and second cutting edges.

7 Claims, 6 Drawing Sheets

MILLING CUTTER FOR T SHAPED GROOVE

FIELD OF THE INVENTION

The present invention relates to a milling cutter for T shaped groove to cut a groove with a T shaped cross section.

BACKGROUND OF THE INVENTION

Prior milling cutters for cutting a T shaped groove are provided with two cutting edges in case the diameter of the hole to be cut is relatively small and are provided with four cutting edges in case the diameter of the hole to be cut is relatively large and the feed speed is increasd to reduce the load on each cutting edge, the material of the cutting edge being cemented carbide which is not easily broken. On the other hand, in order to eliminate any place being not cut, the cutting range of the two cutting edges 3,4 is overlapped in the length of $C_2$ and cutting portion 31 of cutting edge 3 and cutting portion 41 of cutting edge 4 are regulated to be aligned (in a line in FIG. 8). When four cutting edges are employed, there are two cutting edges 3 and two cutting edges 4, the two pairs of cutting edges being able to cut the same place respectively.

In the prior art, as shown in FIG. 8 which is a schematic elevation observed by a stationary one at a certain part of the T shaped groove cutter holding portion 1a from the front side and the milling cutter is rotated by a certain angle to the same position and the two views are overlapped, and as explained before the cutting edges 3,4 cut with an overlapped length $C_2$. Besides, cutting portion 31 ($C_2$ plus $C_3$) of cutting edge 3 and cutting portion 41 ($C_2$ plus $C_4$) of cutting edge 4 form a difference $B_2$ in level as shown in FIG. 5 which is a schematic elevation observed by a stationary one at a certain part of the T shaped groove cutter holding portion 1a from the front side and the milling cutter is rotated by a certain angle to the same position and the two views are overlapped, one of the cutting edges (cutting edge 4 in FIG. 5) touches by its total length (cutting portion 41 i.e. $C_2$ plus $C_4$) causing the cutting edge (cutting edge 4 in FIG. 5) a large amount of load and violent damage. Therefore, in fitting the milling cutter for T shaped groove and cutting edges, in order to eliminate the difference $B_2$ in level of FIG. 5 which is a schematic elevation observed by a stationary one at a certain part of the T shaped groove cutter holding portion 1a from the front side and the milling cutter is rotated by a certain angle to the same position and the two views are overlapped, i.e. in order to put the cutting portions 31 and 41 in a line, severe accuracy is required.

But, the length $C_2$ is overlapped as shown in FIG. 8 and when the cutter is fed to the direction D, the length $C_3$ of work is cut by cutting edge 3, the length $C_4$ is cut by cutting edge 4 and the length $C_2$ is cut by both of the cutting edges 3 and 4 half-and-half. Since a cutting amount difference is caused between the length $C_2$ and $C_3$ in the cutting edge 3 and between the length $C_2$ and $C_4$ in the cutting edge 4, the partial force received on the length of the cutting edge becomes non-uniform. Thereby an increase of feed speed is difficult, and the non-uniformity of force causes increased damage and wear of the cutting edge and as it is difficult to predict when the damage occurs, the reliability of the cutting edge is low and its stock control is also difficult.

Up to now, cutting edges made of high rigidity cemented carbide have been used, but the cost per one cutting edge is quite high and the violent damage and wear have prevented the economical usage of expensive cutting edges.

On the other hand, since it is difficult to adjust the cutting edge mounting seat after the hardening of the milling cutter (there is no way to adjust), the milling cutter for cutting T shaped groove is not hardened sufficiently and the cutting portions 31 and 41 are adjusted so as to be aligned in a line as shown in FIG. 8. Therefore the hardness of the milling cutter itself becomes low and there is a fear of deformation.

OBJECT OF THE INVENTION

It is an object of the invention to provide an economical milling cutter for T shaped groove.

This and other objects and advantages of the invention will become more apparent from the following detailed description taken in conjunction with the accompanying drawings.

SUMMARY OF THE INVENTION

This invention is a milling cutter for cutting a T shaped groove comprising at least three cutting edge mounting seats distributed peripherally on a body at one end flange of the milling cutter, on the first cutting edge mounting seat a first cutting edge is mounted for cutting remotest part from the cutting machine, on the second cutting edge mounting seat a second cutting edge is mounted for cutting a nearest part from the cutting machine, on the third cutting edge mounting seat located between the first and second seats a third round or polygonal cutting edge is mounted, and the third cutting edge projecting radially outwardly from the rotation center line of the body between and from the two portions cut by the first and second cutting edges.

DETAILED DESCRIPTION OF THE INVENTION

Figure 1:
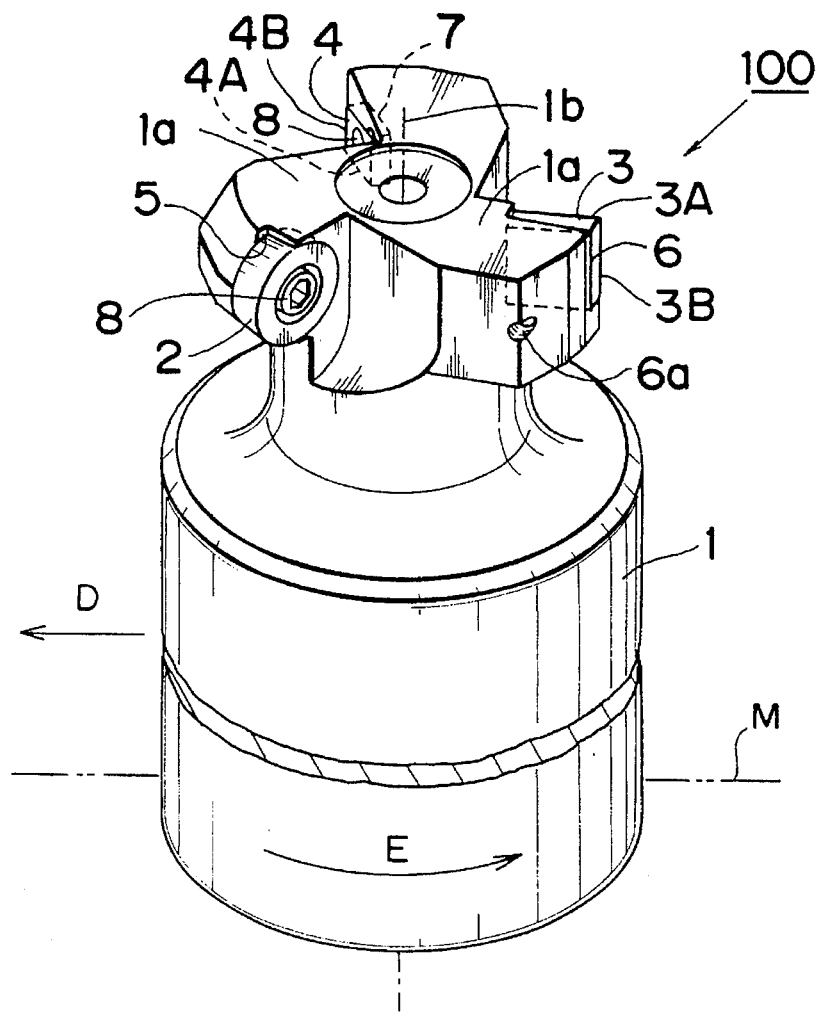
FIG. 1 illustrates a perspective view of a milling cutter for cutting a T shaped groove in accordance with the invention.
Figure 2:
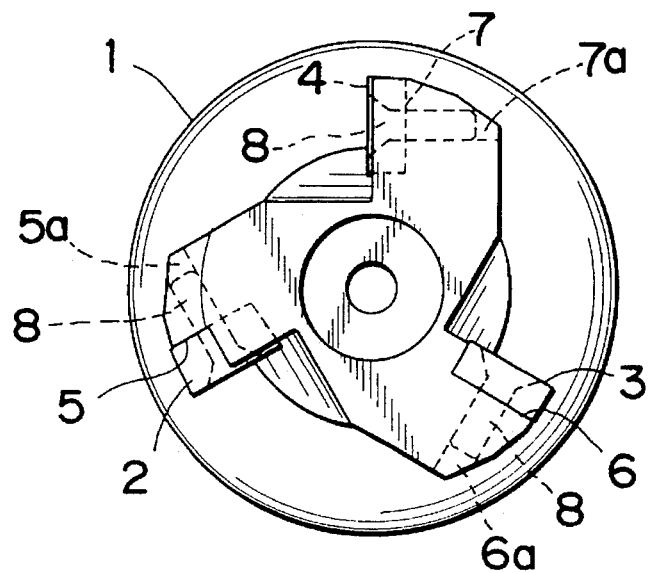
FIG. 2 illustrates a plan view showing an arrangement of cutting edges employed in the milling cutter for cutting a T shaped groove in accordance with the invention.

FIG. 1 illustrates an appearance of the milling cutter for cutting a T shaped groove 100 in accordance with the invention and shows a milling cutter body 1 (generally used up side down) which is fixed vertically on the lower milling machine M, a circular cutting edge 2 (short cylindrical cutting edge), first and second diamond shaped cutting edges 3 and 4 (cube shaped cutting edges), and cutting edge mounting seats 5,6,7. Cutting edge mounting seats 5,6,7 are formed on the three T groove cutting portions 1a (cutter holding portions) formed by cutting three portions of a one end radially outwardly projecting flange of the milling cutter body 1 at even intervals of 120 degrees, the cutting edge mounting seats 5,6,7 being provided with threaded holes 5a,6a,7a respectively for fixing a circular cutting edge 2 and first and second diamond shaped cutting edges 3,4 by bolts 8 with hexagonal wrench hole as shown in FIGS. 1 and 2. An arrow E in FIG. 1 shows the rotation direction of T groove milling cutter 100.

Figure 4:
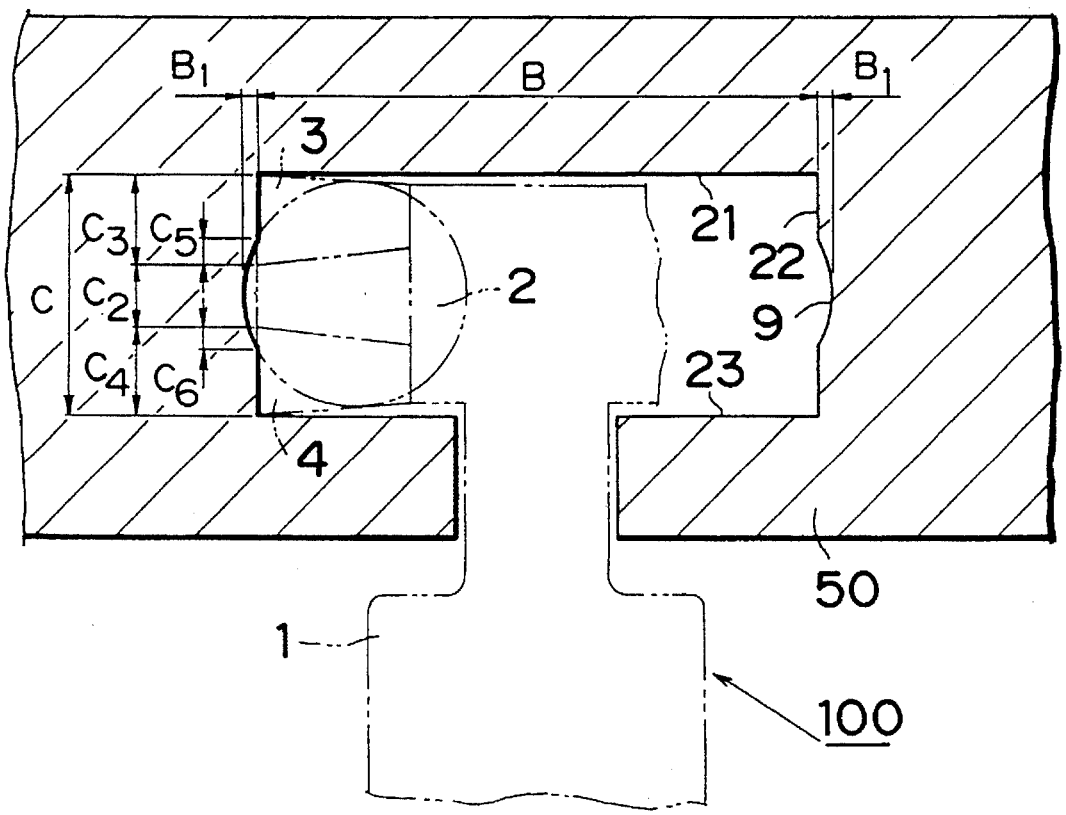
FIG. 4 illustrates a schematic sectional elevation showing the T shaped groove cut by the milling cutter in accordance with the invention.

Diamond shaped cutting edges 3,4 are deviated to an upper portion and lower portion in FIG. 1 as same as prior art milling cutter, each providing a cutting portion 3A for cutting an inner wall surface 21 and a cutting portion 4A for cutting an inner surface 23 both surfaces being at right angles to the center line 1b and cutting portions 3B,4B for cutting inner wall surface 22 parallel with the center line 1b the cutting portions projecting axially and radially outwardly from the cutter holding portions 1a as shown in FIG. 4. The circular cutting edge 2 is disposed between the cutting portion 3B of the diamond shaped cutting edge 3 and the cutting portion 4B of the diamond shaped cutting edge 4 and projects radially outwardly beyond the diamond shaped cutting edges 3, 4. $C_5$ and $C_6$ in FIG. 4 illustrate the length of overlapped cutting portion.

The milling cutter for cutting a T shaped groove 100 explained above is mounted on the milling machine M so as to cut the work 50 (so as to be upside down in FIG. 1). The cutting edges 2, 3, 4 may be made of cemented carbide, hardend ceramic or cermet.

Figure 3:
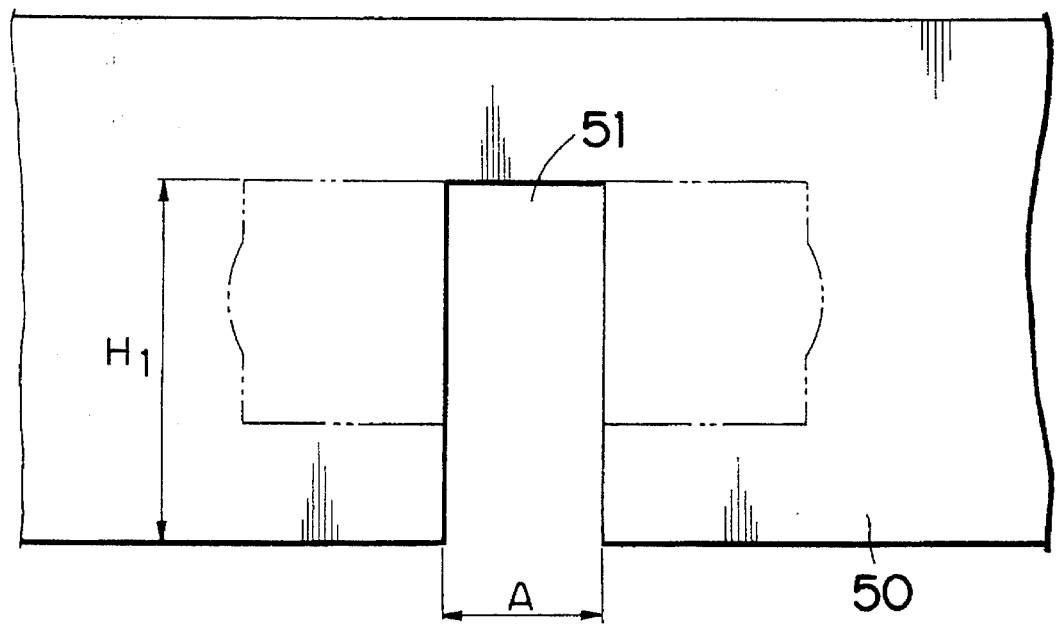
FIG. 3 illustrates an elevation of a cutting groove 51 of a work 50 prior to cutting a T shaped groove.
Figure 12:
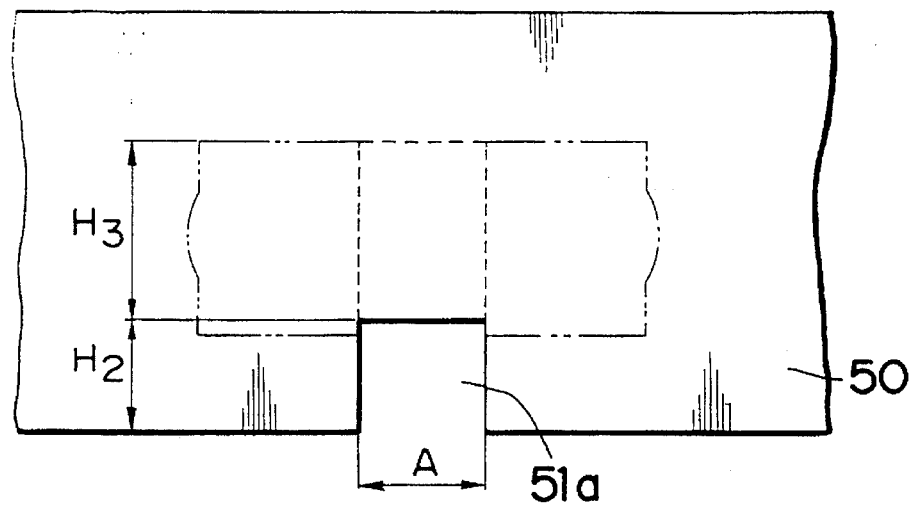
FIG. 12 illustrates an elevation of a cutting groove 51a of the work prior to cutting a T shaped groove.

Now its movement is explained. FIG. 3 illustrates the fixed work 50 that is not yet cut with a T shaped groove. In the work 50, a groove 51 is previously provided with a width A (the groove does not interfere with the milling cutter body 1) and a depth $H_1$, and extending at right angles to the paper of FIG. 3. This is necessary so that with the T milling cutter body 1 does not interfere with the work 50 while cutting the T groove, and is same as the prior art. The depth of the groove 51 may be the length $H_2$ which prevents interference with the T milling cutter 100 while cutting as shown in FIG. 12. In this case, the scope shown by a dotted line with the length $H_3$ and length A is cut by the T milling cutter 100. Width A is necessary to be finished precisely according to the standard JIS which has no relation with this invention. Two dotted imaginary lines in FIG. 3 illustrate a section of T shaped groove being cut by the T milling cutter in accordance with the invention.

T milling cutter 100 (FIG. 1) mounted on the milling machine M cut axially extending length $C_2,C_3,C_4$ on the inner wall 22 by the circular cutting edge 2, and diamond shaped cutting edges 3,4 respectively. Since the circular cutting edge 2 projects radially outwardly by the distance $B_1$ farther than the diamond shaped cutting edges 3, 4, it starts cutting earlier than the diamond shaped cutting edges 3,4.

Figure 9:
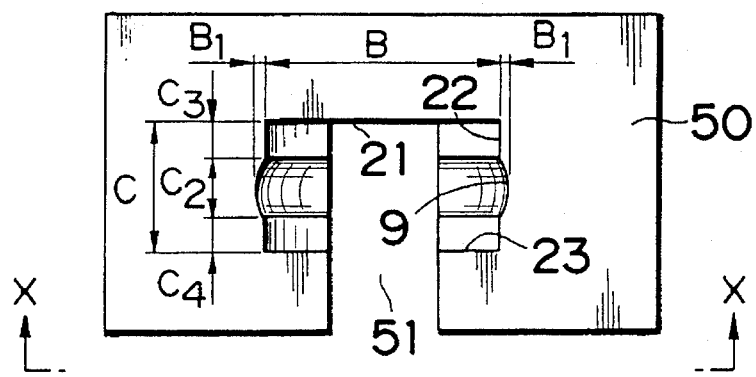
FIG. 9 is an elevation of a work cut half way by the milling cutter in accordance with the invention.
Figure 10:
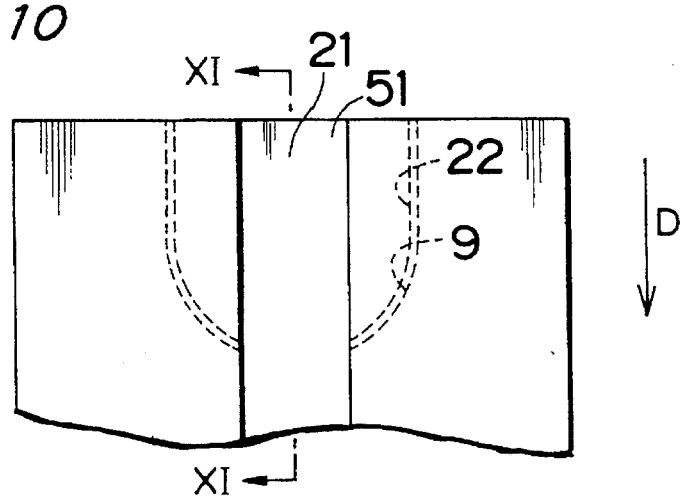
FIG. 10 is a view taken along in the direction of the arrows substantially along the line X—X of FIG. 9.
Figure 11:
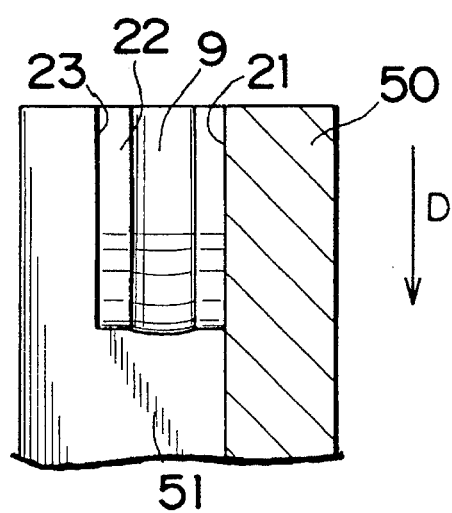
FIG. 11 is a view taken along in the direction of the arrows substantially along the line XI—XI of FIG. 10.

FIG. 9, FIG. 10 and FIG. 11 illustrate the work 50 in process of time of cutting. In FIGS. 10,11, when T groove milling cutter moves to the direction along arrow D, the circular cutting edge 2 cuts the work little by little, then the diamond shaped cutting edges 3,4 start to touch and cut the work. There is an arcuate cut portion 9 formed by the circular cutting edge 2 which forms a distinct feature of the present invention.

In FIG. 4, the circular cut portion 9 is cut more by the length $B_1$ than the inner wall surface 22, the length $B_1$ being sufficiently small compared with the length B between the both wall surfaces 22 and within the cutting tolerance according to the standard JIS.

Figure 5:
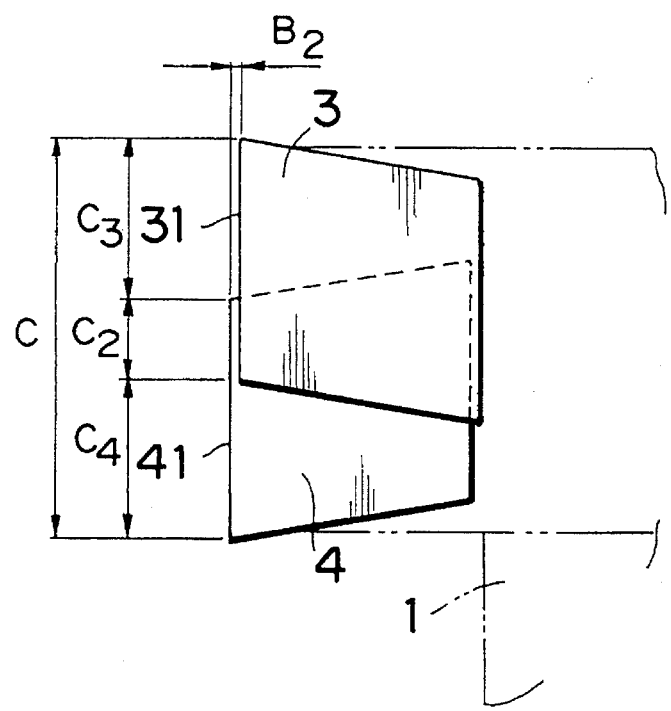
FIG. 5 is a prior art schematic elevation showing a difference $B_2$ in level between a cutting portion 31 of the cutting edge 3 and a cutting portion 41 of the cutting edge 4.
Figure 6:
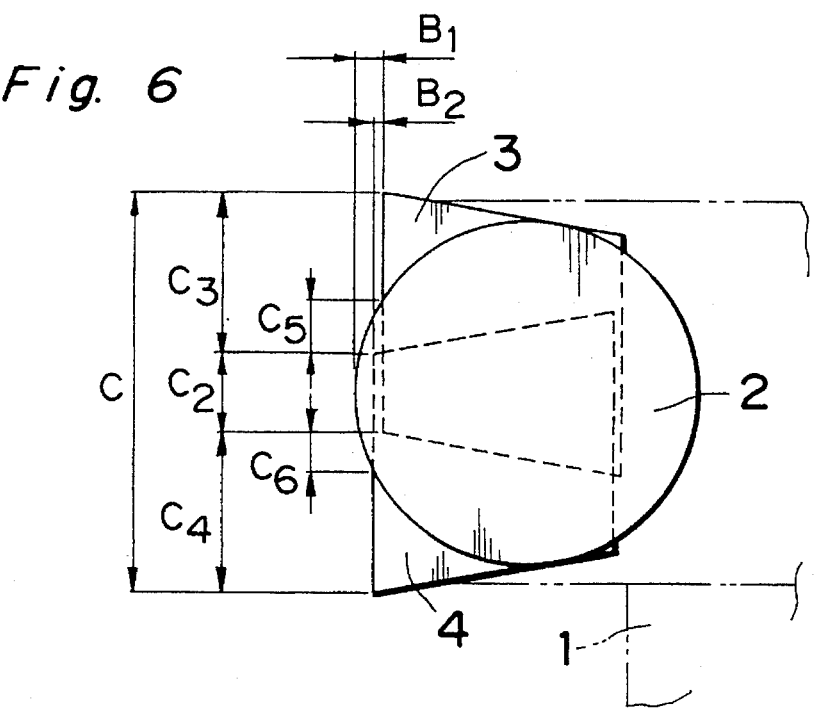
FIG. 6 is a schematic elevation showing fixed positions of each cutting edge in accordance with the invention.

As explained before, FIG. 4 illustrates a temporary overlapped elevations of all cutting edges formed observed by a stationary one at a certain part of the T shaped groove cutter holding portion 1a from the front side with the milling cutter being rotated by a predetermined angle to the same position such that other views are overlapped. In FIG. 4, the attachment of the two diamond shaped cutting edges 3, 4 to the T groove milling cutter body is aligned within the width B as shown by the two dotted imaginary lines, but practically such attachment and adjustment are difficult and need labor and in general a radial difference in level is inevitable as shown in FIG. 5. The difference $B_2$, according to the invention, is cut by the circular cutting edge 2 with radially projecting length $B_1$ ($B_1>B_2$) as shown in FIG. 6.

Figure 7:
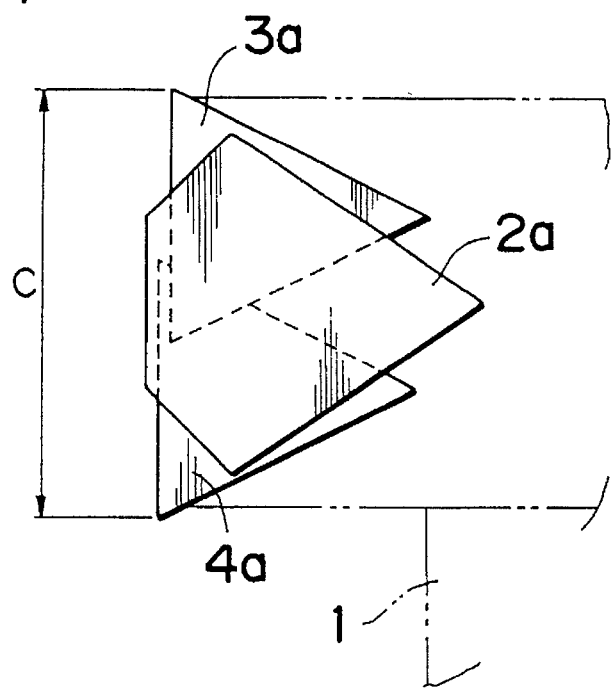
FIG. 7 is a schematic elevation employing triangular cutting edges 3a and 4a in place of diamond shaped cutting edges 3 and 4, and a polygonal cutting edge 2a in place of circular cutting edge 2 in accordance with the invention.
Figure 8:
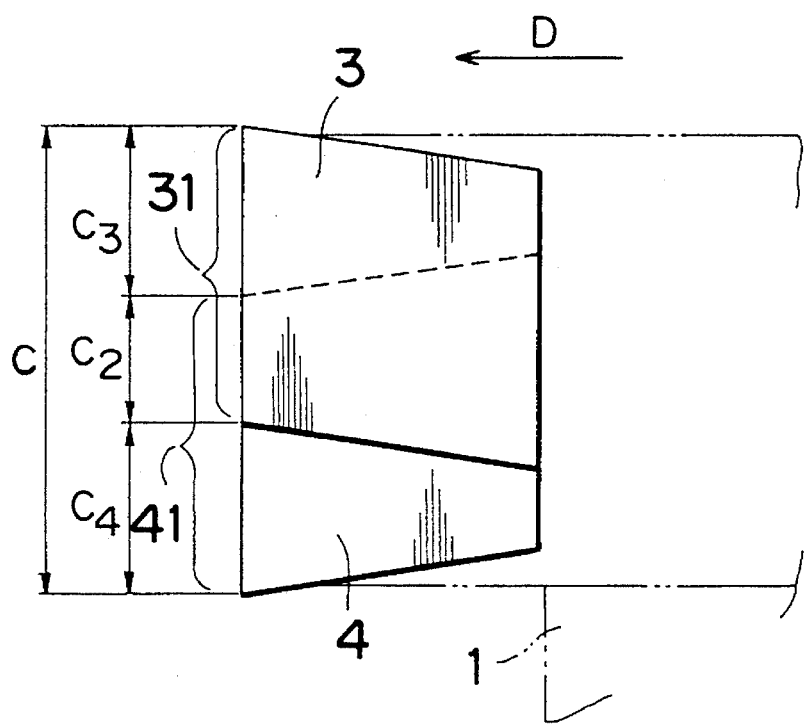
FIG. 8 is a prior art schematic elevation showing two cutting edges with their cutting portion perfectly arranged in one line.

In the embodiment, a circular cutting edge 2 and two diamond shaped cutting edges 3, 4 are employed, but any other shapes may be employed if it is easy to form corresponding cutting edge mounting seats. For example, a pentagonal cutting edge 2a may be used in place of the circular cutting edge 2 as shown in FIG. 7 and triangular cutting edges 3a, 4a may be used in place of the diamond shaped cutting edges 3, 4. A polygonal (more than 5) cutting edge and a triangular or foursided cutting edge may be used in place of the circular cutting edge 2, and four-sided cutting edges or circular cutting edges may be used in place of the diamond shaped cutting edges 3, 4.

Figure 13:
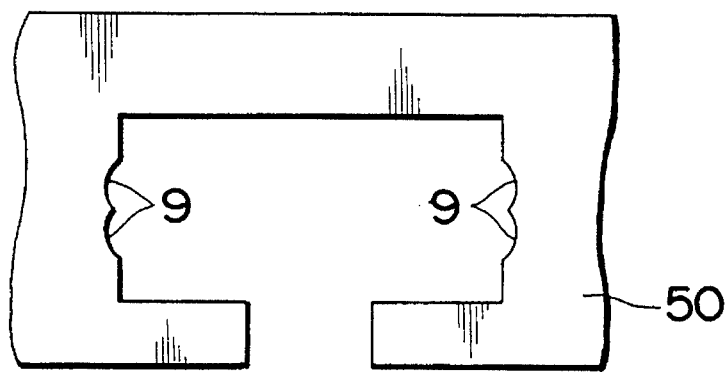
FIG. 13 is an elevation of a cut groove formed by two diamond cutting edges 3 and 4 at both sides and two circular cutting edges 2 therebetween.
Figure 14:
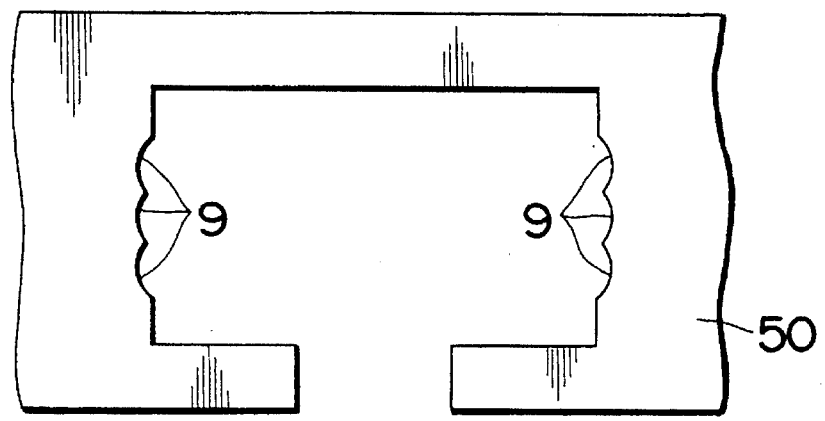
FIG. 14 is an elevation of a cut groove in case that three circular cutting edges 2 are used.

The number of cutting edges is not limited to three, but four, five, six, seven, eight and more cutting edges may be used, and it is preferable to mount these cutting edges on the periphery around the center line 1b at even intervals so as to prevent vibration or noise from the T groove milling cutter 100 while cutting. When balance in the rotational direction is kept, the adjacent angles of the cutting edges may be 60 degrees and 120 degrees in case there are four cutting edges. In case that the depth length C is long and more than three cutting edges are used, more than two circular cutting edges are used remaining no cut portion as shown in FIGS. 13 and 14, while non circular different shaped cutting edges may be used in place of the circular cutting edge 2.

According to the present invention, since each cutting edge cuts uniformly, wear is not biased and the way of wearing is stable causing the easy control of cutter exchanging timing. This eases the stock control of the cutting edges and decreases the cost of the cutting edges to be very economical.

Since circular cutting edge(s) increases the number of cutting edges into three or more, cutting by total length of the cutting portion of each cutting edge is prevented thereby increasing cutting speed (rotational speed of the milling cutter) also increasing the feed speed more than two times compared with prior art, thus it is possible to shorten the cutting time.

Since the load on the the each cutting edge becomes stable, feed speed is able to increase. Cheap cermet cutting edge now being used in the lathe may be used so it is economical. Since cheap cermet cutting edges may be used economically, cost for each cutting edge becomes very low. The number of exchange the cutting edges decreases, the labor for exchange the cutting edges also decreases and thus working efficency increases.

The circular cutting edge can be rotated by loosening the bolt 8 and rotating the cutting edge a bit when it wears, then it is used many times without exchanging with a new one, so it is also economical.

When three cutting edges are disposed circumferentially at even intervals, each cutting edge cuts about one third i.e. $C_2$, $C_3$, $C_4$ in FIG. 4, cutting resistance to the T groove milling cutter stabizes and no noise and vibration in cutting process occurs.

When the T groove milling cutter 100 (FIG. 1) is mounted on the milling machine, attaching accuracy is not so strictly required compared with prior art, shorter time is required for attaching the cutting edges, thus working efficiency increases.

Since the cutting edge mounting seat needs not be so accurately finished compared with prior art, hardening of the T groove milling cutter is able to be finished hard. Thus, the hardness of the milling cutter increases, it is difficult to deform the milling cutter from the force from outside and the durability of the T groove milling cutter increases.

I claim:

1. A milling cutter for cutting laterally extending portions of a T-shaped groove, said milling cutter having an axis of rotation and being configured to move perpendicularly to the axis of rotation to form the laterally extending portions, said milling cutter comprising:

at least three cutting edge mounting seats arranged on an end flange of the milling cutter and distributed peripherally about the axis of rotation, said milling cutter being configured to extend along the axis of rotation through an upright groove comprising an upright portion of the T-shaped groove;

a first cutting edge mounted on a first of said mounting seats and configured to cut a first portion of the T-shaped groove located axially opposite said upright groove;

a second cutting edge mounted on a second of said mounting seats and configured to cut a second portion of the T-shaped groove located axially adjacent said upright groove; and a third cutting edge mounted on a third of said mounting seats and configured to cut a third portion of the T-shaped groove extending axially between the first portion and the second portion, said third cutting edge being arranged to extend radially farther from the axis of rotation than said first cutting edge and said second cutting edge.

2. A milling cutter according to claim 1, wherein a circumferential cutting path of said first cutting edge slightly overlaps a circumferential cutting path of said third cutting edge over an axial distance, and wherein a circumferential cutting path of said second cutting edge slightly overlaps the circumferential cutting path of said third cutting edge over an axial distance.

3. A milling cutter according to claim 1, wherein said first cutting edge and said second cutting edge are provided with respective cutting portions substantially parallel with the axis of rotation of the milling cutter and with respective cutting portions substantially at right angles with the axis of rotation of the milling cutter.

4. A milling cutter according to claim 1, wherein said first, second, and third cutting edges are made of any one of cemented carbide, hard ceramic and cermet.

5. A milling cutter according to claim 1, wherein said cutting edges are disposed such that each cutting edge cuts approximately one-third of an axial depth of said laterally extending portions.

6. A milling cutter according to claim 1, wherein said third cutting edge is circular, and wherein said third cutting edge is rotatably mounted on said third mounting seat.

7. A milling cutter according to claim 1, wherein said first cutting edge and said second cutting edge are triangular, and wherein said third cutting edge is polygonal.

\* \* \* \* \*